H. B. ANDREWS.

PROCESS OF MAKING TERMINALS, AND TERMINALS.

APPLICATION FILED JUNE 9, 1917.

Reissued Dec. 4, 1917. 14,401

Inventor

Herbert B. Andrews

By Alexander Sowell

Attorney

UNITED STATES PATENT OFFICE.

HERBERT B. ANDREWS, OF BATTLE CREEK, MICHIGAN, ASSIGNOR TO THE H. B. SHERMAN MANUFACTURING COMPANY, OF BATTLE CREEK, MICHIGAN, A CORPORATION OF MICHIGAN.

PROCESS OF MAKING TERMINALS, AND TERMINALS.

14,401. Specification of Reissued Letters Patent. Reissued Dec. 4, 1917.

Original No. 1,144,281, dated June 22, 1915, Serial No. 26,602, filed May 3, 1915. Application for reissue filed June 9, 1917. Serial No. 173,892.

*To all whom it may concern:*

Be it known that I, HERBERT B. ANDREWS, a citizen of the United States, residing at Battle Creek, in the county of Calhoun and State of Michigan, have invented certain new and useful Improvements in Processes of Making Terminals, and Terminals; and I hereby declare that the following is a full, clear, and exact description thereof, reference being had to the accompanying drawings, which form part of this specification.

This invention is a novel terminal and method of making same and the like and is especially designed for making so called "terminals" used for capping the end of a bunch of wires, or a wire cable, to facilitate making electrical connections therewith.

The principal object of the present invention is to make such terminals with less expense and of superior finish and appearance. The invention includes the novel terminals and method of making the same; as will be hereinafter more fully explained.

Heretofore such terminals have been made either by bending them up out of pieces of sheet metal, or by cutting metal tubes into short sections and flatting one end of each section. The resultant terminals are rough in appearance, and the labor and machinery required for their manufacture makes them expensive. As compared with the prior methods the present invention economizes metal, reduces the cost of manufacture, produces a more finished looking terminal, and reduces waste of material to the minimum.

The novel terminal is produced by first blanking a piece of metal and then drawing the same into a cartridge of desired internal diameter and then flatting the closed end of the cartridge to form the tang of the socket, and complete the terminal.

I will explain the invention in connection with the accompanying drawings which illustrate the various steps employed in the process of manufacturing terminals and the like, and will enable others to adopt and use the same.

In said drawings:—

Figure 1:
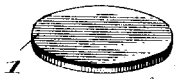
Figure 1 is a diagrammatic view of a blank which may be used in the initial step of forming a hanger or terminal.
Figure 2:
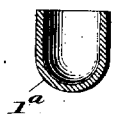
Fig. 2 is a sectional view illustrating a cup formed from such a blank by "drawing" the same.
Figure 3:
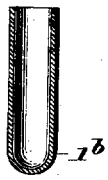
Fig. 3 is a sectional view of the cartridge produced from such blank and ready for flatting.
Figure 4:
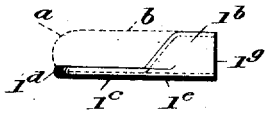
Fig. 4 is a side view of the cartridge flatted to produce a terminal, the original form of the cartridge prior to flatting being indicated by the exterior dotted line.
Figure 5:
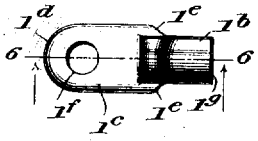
Fig. 5 is a top plan view of the complete terminal.
Figure 6:
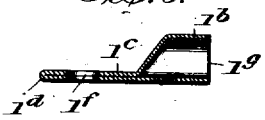
Fig. 6 is a longitudinal sectional view on line 6—6 Fig. 5.

In making a terminal by this process a blank, as 1, Fig. 1, is punched out of sheet metal, preferably copper; said blank being then drawn or cupped either in the original suitable die press or in the usual well known manner into cup shape as indicated at $1^a$ Fig. 2. This cup $1^a$ is then drawn, by further drawing operations in a suitable die press, in the well known manner, into an elongated cartridge $1^b$, Fig. 3, such cartridge being of about the internal diameter desired for the socket of the finished terminal. The closed end of the cartridge $1^b$ is then flattened between the points *a* and *b*, as indicated in Fig. 4 by any suitable means, the flattened portion forming the tang $1^c$ of the finished terminal and the unflattened portion forming the socket $1^g$ of the finished terminal, the tang and socket being integral. The tang portion $1^c$ has its outer end rounded as indicated at $1^d$ such end being formed by the compression of the closed end of the cartridge; and the part $1^c$ is wider than the socket portion $1^g$, or the original diameter of the cartridge $1^b$; the connection between the socket $1^g$ and tang $1^c$ is stiffened by the side portions or flanges $1^e$ which are produced by or during the flatting operation on the part $1^c$. The tang $1^c$ is perforated at $1^f$ by a suitable tool or machine in the well known manner for the passage of a securing bolt, or for engagement with a nail, hook, binding post or member to which the terminal is to be attached.

The resultant terminal has a tang of double thickness of metal without any external seam, the end $1^d$ of the tang being closed, so that moisture is excluded, and part $1^d$ gives a neat finish to the outer end of the tang. Such terminals can be made of light metal and be sufficiently strong as the metal at the end $1^4$ is not divided. Terminals and the like thus formed will be uniform in appearance, and can all be drawn from blanks of uniform thickness and quality and their tangs have no sharp angles, corners or rough edges.

The aforesaid method of construction of the terminals is economical and the advantages of the invention will be readily appreciated by those familiar with the art.

What I claim is:

1. The process of making terminals and the like consisting in drawing a blank into a cartridge of the desired length and diameter, and flatting the closed end of such cartridge to form the tank of the terminal, the unflattened portion forming the socket thereof.

2. The process of making terminals and the like consisting in drawing a blank into a cartridge of the desired length and diameter, flatting the closed end of such cartridge to form the tang of the terminal, the unflattened portion forming the socket thereof, and perforating the tang, substantially as described.

3. The herein described process of making terminals, consisting in drawing a sheet metal blank into a cartridge of about the desired length of the terminal and having an interior diameter about equal to that desired for the terminal socket, then flatting the closed end of such cartridge to form the tang of the terminal, the unflattened portion forming the socket thereof, substantially as described.

4. A drawn terminal consisting of a metal cartridge drawn so that it is closed at one end and open at the other, the part adjacent said open end forming a socket, and the closed end and part adjacent said closed end being flattened and forming a tang closed externally both on its sides and outer end, said tang being rounded at its outer extremity, substantially as described.

5. The herein described drawn metal terminal consisting of a metal cartridge drawn so that it is closed at one end and open at the other, the part adjacent said open end forming a socket; the closed end and part adjacent said closed end being flattened forming a tang rounded at its outer extremity and closed externally on both sides and end, said tang being also perforated, substantially as described.

6. The process of making terminals and the like consisting in drawing a blank into a closed ended cartridge of the desired length and diameter and having its closed end rounded; and flatting the closed end of such cartridge to form the tang of the terminal; the unflattened portion of the cartridge forming the socket of the terminal.

7. The herein described process of making terminals, consisting in drawing a sheet metal blank into a cartridge of about the desired length of the terminal and having an interior diameter about equal to that desired for the terminal socket and one end rounded, then flatting the rounded end part of such cartridge to form the tang of the terminal; the unflattened portion of the cartridge forming the socket of the terminal; and perforating the tang, substantially as described.

8. The process of making terminals and the like consisting in drawing a blank into a closed ended cartridge of the desired length and diameter having its closed end rounded, and flatting the closed end of such cartridge to form the tang of the terminal, the unflattened portion of the cartridge forming the socket of the terminal; and perforating the tang.

In testimony that I claim the foregoing as my own, I affix my signature.

HERBERT B. ANDREWS.